Reissued Oct. 4, 1927. Re. 16,754

UNITED STATES PATENT OFFICE.

ERNEST K. PETERS, OF FRESNO, CALIFORNIA.

LINING FOR DENTAL PLATES AND PROCESS OF PREPARING THE SAME.

No Drawing. Original No. 1,589,552, dated June 22, 1926, Serial No. 720,473, filed June 16, 1924. Application for reissue filed May 28, 1927. Serial No. 195,133.

My invention relates to an improved method of lining dental plates with gold or similar metals.

Heretofore, in the art of dentistry, lining plates with gold has been accomplished by first securing to the vulcanite side of a thin sheet of gold a sheet of wire mesh or screen, by means of solder, the wire screen being attached to the sheet of gold at a number of spaced points only. The gold lining thus prepared was then swaged and burnished over the usual previously prepared form or model; then flasked and vulcanized in the usual manner, the wire mesh becoming embedded in the vulcanite during the vulcanizing process and securely connecting the gold lining and plate together.

It has been found in using the method above described that at the points where the mesh was soldered to the lining the solder formed hard spots or high spots in the finished model which made the gold lining of unequal stiffness, consequently difficult to swage, with the result that the blows required to drive it to the model often impaired the model, with ill results in adaptation to the mouth. It often happened also that the blows required in swaging forced the solder spots through or partly through the lining, or distorted the same sufficiently to render the same unfit for use.

My invention contemplates production of a lining material, preferably of gold, having one side thereof treated to produce a spongy or porous surface, the interstices of which will absorb or become filled with the vulcanite during vulcanization, or other plastics used to make plates, and upon completion thereof will form a permanent attachment between the lining and plate.

A further object is to provide a lining material of the above character which may be easily and quickly prepared for use without in any way impairing the flexibility or other qualities thereof.

Other objects and advantages will appear hereinafter and, while I will describe the preferred form of my invention, I wish it understood that I do not limit myself to such preferred form, but that various changes and adaptations may be made therein without departing from the spirit of my invention.

In practicing the process which constitutes my invention I make my linings preferably of sheets of pure gold. This pure gold sheet is first burnished and swaged to a previously prepared model, thus forming the lining. The lining is then filled with plaster of Paris as the base on which to do the work of processing. A blow pipe is then used throwing the flame on the gold until the steam lifts the gold lining free from the model. I then take amalgam composed of substantially one part of pure powdered gold and two parts of redistilled mercury and preferably apply same with a small brush to spread same evenly over the entire surface of the gold lining against which the rubber of the finished plate is to be united. I allow the amalgam to remain upon or against the gold lining until the mercury penetrates the molecules of the lining to form a secure union between the amalgam and the lining. The lining with the amalgam thereon is then preferably subjected to a direct flame of sufficient heat to volatilize the mercury. As the mercury volatilizes and explodes out of the amalgam and gold lining, the explosion causes the formation of a porous and spongy surface coating upon the lining. Additional applications of the amalgam and volatilization of mercury therefrom are continued until sufficient penetration and deposit of the gold of the amalgam is had to form this spongy or porous surface evenly over the entire surface of the gold lining. The spongy or porous surface is then filled with wax to protect the pores or sponge from being crushed or damaged, and the lining is returned to the original model to be again swaged into close contact with the same. In swaging the same I may use any of the known swaging agents, but I preferably make use of corn meal. In case it appears to be desirable to reanneal and reswage the lining the wax may be easily burnt out of the same, the lining being then heated to a red heat and cooled and wax filled into the spongy or porous surface as before. This action may be repeated as many times as is desired to obtain proper adaptation of the gold lining to the model. No burnishing however may be indulged in at this stage of the work as it would destroy or flatten out the spongy or porous surface which is essential to the further successful carrying out of the steps of my improved process.

After the lining has been fully prepared in the manner above stated and completely and accurately swaged and formed to fit the model the wax is finally eliminated by being burned out of the porous or spongy surface. This surface is then filled with rubber preferably dissolved in chloroform. It is better to apply the same in a thin solution allowing the chloroform to evaporate each time until the spongy or porous surface is filled up to a degree sufficient to form a rubber base on which and with which the upper rubber forming the dental plate will properly unite. The case is then flasked and packed in the usual manner, closing the flask for test if desired. After this is done and just before closing the flask the last time the lining is placed on the model and finally pressed to position with gauze, wet in clean water, or the lining may be covered with a thin sheet of a protecting medium such as a rubber dam or other similar materials known to the dental profession. The entire lower half of the flask may now be placed in a swage block of very large size and the lining again swaged, if it is a thick lining. If, however, the lining is thinner than 36 gage it is only necessary to press the same to place with the gauze and the pressure of the rubber when closing the flask will properly force or swage the gold lining to the model. When the case has been flasked in the manner stated, the case is vulcanized in the ordinary way. Since the rubber is filled completely into the porous or spongy surface of the lining, by the method previously described of painting with dissolved rubber, this will unite perfectly with the rubber (unvulcanized) of the body of the plate as the flask is closed. Hence, after vulcanization and upon cooling, there will be formed a permanent attachment between the pure gold lining and the vulcanite of the plate.

Having described my invention, what I claim is:

1. The method of producing a metallic lining for dental plates which consists in coating one side thereof with an amalgam having a relatively high mercury content, then subjecting the same to heat sufficient to cause rapid volatilization of the mercury and produce a spongy surface.

2. The method of producing a metallic lining for plastic material which consists of coating one side thereof with an amalgam having a relatively high mercury content and then causing rapid volatilization of the mercury.

3. The method of producing a metallic lining for dental plates which consists in coating one side thereof with an amalgam having a relatively high mercury content, then subjecting the same to heat sufficient to cause rapid volatilization of the mercury.

4. The method of producing a metallic lining for plastic material which consists of coating one side thereof with an amalgam composed of mercury and powdered lining material, and then subjecting the same to heat sufficient to boil out the mercury whereby a spongy coating is formed upon said coated surface.

5. The method of producing gold lining for plastic material which consists of coating one side of the plastic material with an amalgam composed of mercury and powdered gold, and then exposing the same to a heat sufficient to cause substantially instant volatilization of the mercury.

6. The herein described process of lining dental plates comprising first forming a lining of pure gold to fit the plate, applying an amalgam of gold and mercury to the surface of the lining, volatilizing the mercury to form a porous spongy surface on the lining, filling the porous and spongy surface with rubber to form a base, attaching the rubber base to the plate and then vulcanizing the base and plate together to adhere the lining permanently to the plate.

7. The herein described process of lining dental plates comprising first swaging a lining of pure gold to fit a model, removing the lining from the model, coating the outer face of the lining with gold and mercury amalgam, volatilizing the mercury to produce a porous and spongy surface on the lining, filling the porous spongy surface with protective material and again swaging the lining to the model, removing the protective material and filling the porous spongy surface with rubber to form a base, adhering the rubber base to the rubber of the plate, and then vulcanizing the two together.

In testimony whereof I affix my signature.

ERNEST K. PETERS.